(12) United States Patent
Leonard et al.

(10) Patent No.: US 9,238,473 B2
(45) Date of Patent: Jan. 19, 2016

(54) INCREMENTED BRAKE PIPE PRESSURE REDUCTION

(71) Applicant: NEW YORK AIR BRAKE, LLC, Watertown, NY (US)

(72) Inventors: Erich Leonard, Clayton, NY (US); John Reynolds, Carthage, NY (US)

(73) Assignee: New York Air Brake, LLC, Watertown, NY (US)

( * ) Notice: Subject to any disclaimer, the term of this patent is extended or adjusted under 35 U.S.C. 154(b) by 3 days.

(21) Appl. No.: 14/298,272

(22) Filed: Jun. 6, 2014

(65) Prior Publication Data

US 2015/0353061 A1 Dec. 10, 2015

(51) Int. Cl.
| | | |
|---|---|---|
| *B60T 13/66* | (2006.01) | |
| *B60T 15/00* | (2006.01) | |
| *B61H 13/02* | (2006.01) | |
| *B60T 7/08* | (2006.01) | |
| *B61H 13/00* | (2006.01) | |

(52) U.S. Cl.
CPC ............... *B61H 13/02* (2013.01); *B60T 7/085* (2013.01); *B60T 13/662* (2013.01); *B60T 13/665* (2013.01); *B61H 13/00* (2013.01)

(58) Field of Classification Search
CPC ..... B60T 7/085; B60T 13/665; B60T 13/662; B61H 13/00; B61H 13/02
USPC ................... 303/3, 16, 20, 51; 701/19, 20, 70
See application file for complete search history.

(56) References Cited

U.S. PATENT DOCUMENTS

| | | | |
|---|---|---|---|
| 5,415,465 A * | 5/1995 | Skantar | B60T 15/16 303/16 |
| 6,116,382 A | 9/2000 | Deramaux et al. | |
| 6,286,911 B1 * | 9/2001 | Wright | B60T 13/665 188/1.11 E |
| 2014/0151162 A1 | 6/2014 | Mathern et al. | |

FOREIGN PATENT DOCUMENTS

| | | |
|---|---|---|
| JP | 08255031 | 10/1996 |
| JP | 2013158180 | 8/2013 |

OTHER PUBLICATIONS

International Search Report Form PCT/ISA/220, International Application No. PCT/US2014/041319, pp. 1-12, Dated Feb. 26, 2015.

* cited by examiner

*Primary Examiner* — Adam Tissot
(74) *Attorney, Agent, or Firm* — David L. Nocilly; Bond Schoeneck & King, PLLC

(57) ABSTRACT

A system and method for incrementally accomplishing brake pipe reductions using an operator button, touch sensitive screen or other human machine interface. The system is preferably made available to the user when the brake handle is positioned in the 'minimum' brake application position and allows an operator to create a more precise target reduction value without having to manually move the brake handle to the location that the operator believes may result in the desired reduction. Using small, predetermined increments, the system allows for more precise control over brake pressure without an operator having to estimate what handle movement will accomplish the desired brake pressure.

17 Claims, 4 Drawing Sheets

INCREMENTED BRAKE PIPE PRESSURE REDUCTION

BACKGROUND OF THE INVENTION

1. Field of the Invention

The present invention relates to locomotive braking systems and, more particularly, to a system and method for incrementally reducing brake pipe pressure.

2. Description of the Related Art

Locomotive operators using pneumatic or electro-pneumatic braking systems are often required to make minor reductions in brake pipe pressure beyond the minimum braking level when grade braking or in other situations. Brake control levers positioned on a locomotive mounted brake controller are used as the man machine interface for brake pipe control. These levers typically have set positions for a defined reduction of equalizing reservoir (ER) pressure, which is the pilot pressure for the brake pipe relay and thus provides the target level for the brake pipe (BP) pressure. For example, the handle position typically labelled 'minimum' allows for the minimum amount of brake which can be applied, while the position referred to as 'full service' provides for a normal, full brake application.

While it is easy for an operator to get the brake pipe reduction requested at the 'set' positions, such as 'minimum' or 'full service', often the operator would like to have a reduction of brake pipe (BP) pressure just slightly greater than afforded by the 'minimum' position to operate the train in certain conditions. In these cases, the operator often must carefully manipulate the lever beyond the 'minimum' position toward the 'full service' position with caution so as not to over-brake the train. While control levers are good at giving the operator quick intuitive control of the brake level, they do not allow an operator to control the brake pipe (BP) pressure between the preconfigured 'set' positions as precisely as they desire in some situations. Another issue with conventional braking systems is that the locomotive operators making reductions in brake pipe pressure must often prevent the locomotives brakes from applying by using a bail off feature due to operating rules or the conditions of train control. In these cases, the operator must use both hands to apply the brakes. These same issues exist in electronically controlled pneumatic (ECP) brake systems.

BRIEF SUMMARY OF THE INVENTION

The present invention comprises an incremental brake pipe reduction system that allows an operator to create an equalizing reservoir (ER) target value without having to manually move the handle to an imprecise position. By using a pushbutton, a switch, or a touchscreen on the man-machine brake control interface or through an input or communication message to the brake system from another HMI device such as a button or operator display screen on the locomotive, the operator can request incremental reductions in brake pressure to more accurately select the desired level of braking. For example, once an operator has requested a 'minimum' brake application, the operator may then reduce brake pipe pressure in small, predetermined increments to provide for more precise control over brake pressure without having to move the brake handle to a position that the operator guesses will accomplish the desired decrease in desired brake pressure. Optionally, an amount of BP reduction within the service zone between 'minimum' and 'full service' could also be enabled to allow for this incremental reduction to occur.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
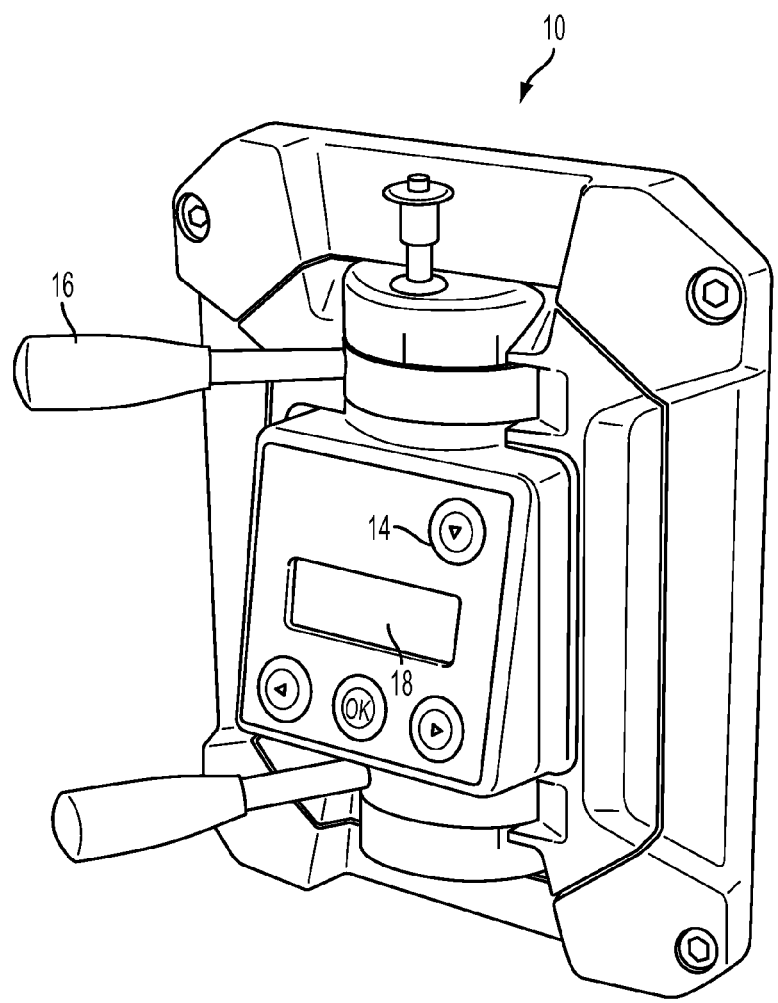
FIG. 1 is a perspective view of a brake controller for implementing incremental brake pressure reduction according to the present invention.

Referring now to the drawings, wherein like reference numerals refer to like parts throughout, there is seen in FIG. 1 a brake controller 10 including a system 12 for incrementally adjusting brake pressure. As seen in FIG. 1, system 12 is made available to an operator by a single button 14 that allows operator to incrementally reduce brake pressure without having to move brake handle 16. It should be recognized by those of skill in the art that button 14 may instead comprise a switch, a touchscreen, or a combination thereof on brake controller 10, and that incremental reductions may be accomplished by depressing button 14 a series of times to accomplish a series of individual, predetermined reductions or holding button 14 down while a keystroke buffer gradually and periodically cycles through a series of incremental reductions until the appropriate level is reached and the operator releases button 14. A display 18 may also be provided to show the operator the specific brake pressure being selected, or combined with button 14 as a touchscreen.

Figure 2:
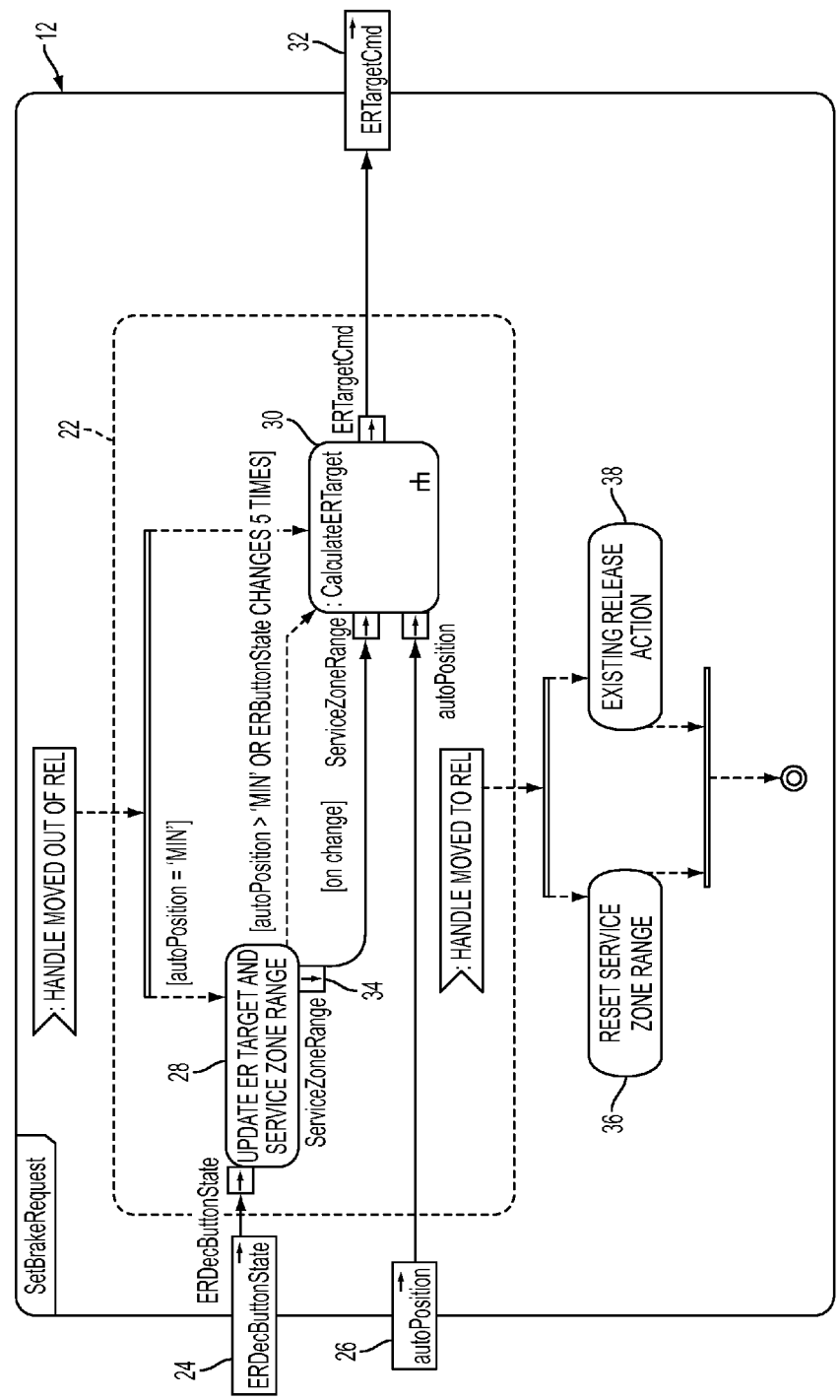
FIG. 2 is a diagram of an exemplary embodiment of a method of implementing incremental brake pressure reduction according to the present invention.

System 12 further comprises a controller 22 responsive to button 14 that implements the desired incremental reduction in brake pressure in the locomotive braking system. For example, controller 20 is programmed to implement the activities seen in FIG. 2. Controller 22 receives signals 24 and 26 representing the state of button 14 and the position of handle 16, respectively. When signal 26 indicates that handle 16 is in the desired position, such as 'minimum,' controller 22 reads the state of button 14 from signal 24, updates the ER target pressure 28 and calculates the desired ER target pressure 30, and then outputs a command 32 to accomplish the desired pressure reduction. As explained in more detail below, controller 22 may also reconfigure the service zone range 34 to account for the incremental reductions selected by an operator using button 14. When handle 16 is moved back to the 'release' position, the service zone is reset 36 and the existing brake pressure action 38 is released. While FIG. 2 depicts controller 22 programmed to implement system 12 when handle 16 is in the 'minimum' position, other appropriate positions may be used.

System 12 may be programmed to implement various incremental reduction scenarios. For example, in a first embodiment of the present invention, button 14 can be depressed once for each increment desired, with a predetermined increment level such as individual steps of between 0.5 and 3 psi. In another embodiment, button 14 can be pressed as above or can also be held down with the feedback on a display 18 showing the ER target as it changes on an incremental basis. Button 14 could be released at any time resulting in the incremental reduction ceasing and the desired level shown on display 18. Alternatively, system 12 may be programmed to restrict the amount of brake pipe reduction allowed by the pressing of button 14, such as by having a maximum amount of reduction that is possible using button 14, such as only allowing 1 psi of additional reduction, or limiting the reduction to the full service brake pipe level.

To improve visibility, button 14 may include illumination, such as LEDs that are positioned internally behind button 14 or externally and directed at button 14, to illuminate button 14 when system 12 is available for use, such as when handle 16 is moved to the 'minimum' position. Illumination may be turned off when system 12 is disabled, such as by further motion of handle 16 or when a predetermined maximum amount of incremental reduction is reached.

Figure 3:
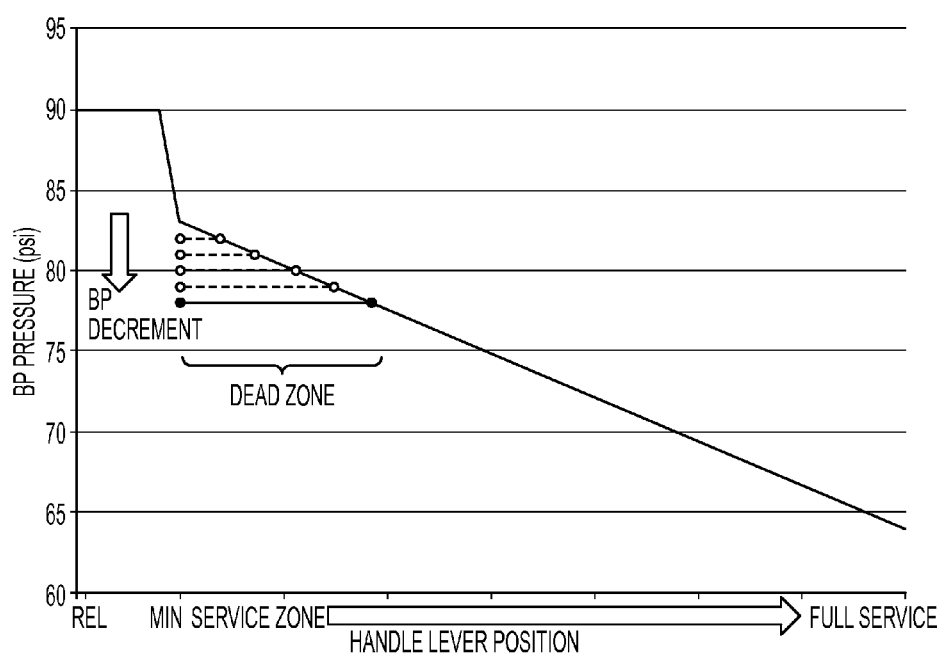
FIG. 3 is a graph of the effect of incremental brake pressure reduction on the service zone without adjustment according to the present invention.

When the BP is reduced beyond a 'minimum' application via system 12 with the handle still in the 'minimum' position, the service zone range, or the amount of BP reduction remaining from the current level to the 'full service' level, is reduced. As a result, further movement of handle 16 will not reduce the pressure, thereby causing a "dead zone" where movement of the handle that is typically understood to reduce brake pipe pressure does not do so. This effect may be seen in FIG. 3, wherein incremental BP reductions reduce the brake pipe pressure a further five psi from minimum and thus a portion of the movement of handle 16 from the minimum to 'full service' position will not cause any additional reduction in pressure until the position of handle 16 moves beyond the point where the typical handle-related reduction exceeds the amount of incremental reduction previously accomplished via button 14. For example, if an operator places the handle in the 'minimum' position it normally results in a BP reduction of 7 psi from normal. The operator may then use button 14 to reduce the BP a total of 12 psi from the set point pressure, such as by pressing button 14 five times if the incremental reduction is set to one psi. If the operator were then to move the handle halfway between Min and Full Service (FS), and the FS reduction was 26 psi from normal, the handle movement would not result in any appreciable change in pressure over most of the distance because the move from 'minimum' to the halfway position only amounts to a single psi of reduction (13 psi total) over the 12 psi reduction that has already been accomplished by moving handle 16 to "minimum" and then depressing button 14 five times for an additional five psi reduction.

Figure 4:
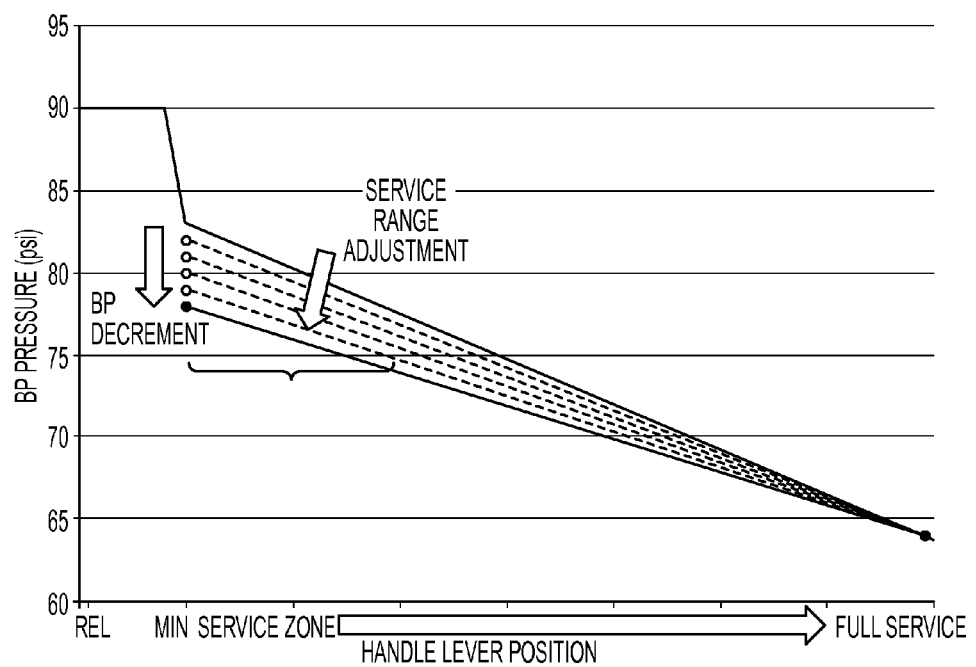
FIG. 4 is a graph of the effect of incremental brake pressure reduction on the service zone with adjustment according to the present invention.

To avoid this effect, system 12 may optionally be programmed, such as in software running in controller 22, to adjust the amount of reduction associated with the movement of handle 16 to account for incremental reductions made via button 14, thereby eliminating any "dead zone." As seen in FIG. 4, the service range may be adjusted to change the amount of pressure reduction associated with the movement of handle 16 so that the entire range of movement of handle 16 will accomplish a reduction in pressure relative to the decremented starting pressure and the full service pressure. For example, as seen in FIG. 4, movement of handle 16 will reduce brake pipe pressure throughout its entire range of movement, albeit at a slower rate of reduction, thereby compensating for the fact that pressure when handle 16 is first moved from the 'minimum' is less than the non-decremented minimum pressure level. Stated another way, movement of handle 16 from minimum to full service will reduce the pressure at a rate that is slightly less than the rate of reduction without adjustment to compensate for the fact that the starting pressure has been decremented by the operator of system 12, thus allowing movement of handle 16 to effect a reduction throughout its entire range of movement.

In the embodiment of system 12 having automatic readjustment of handle operated pressure reduction, the present invention may optionally allow for automatic bail off of the locomotive brakes similar to that in conventional systems that allow for bail off of an initial application of the brakes. In this embodiment, an operator, having bailed off an initial application for a defined period of time (with the timing adjustable to customer requirements), may have the bail off actuated for a defined period of time (also adjustable to customer requirements) for each time button 14 is pressed. The bail off may be immediately cancelled if handle 16 is moved by the operator. Thus, controller 22 may be programmed to respond to signals 24 received from button 14 to actuate a bail off operation for predetermined time period. System 12 may additionally be programmed to provide an automated bail off of a brake application according to prior bailing off performed historically, such as in one or more prior manual brake applications using handle 16. Any automated bail off may also be cancellable by programming system 12 to cancel any automated bail off in the event that handle 16 is moved by the operator.

What is claimed is:

1. A system for incrementally reducing brake pipe pressure in a locomotive braking system, comprising:
   a brake controller having a brake handle moveable between a release position, a minimum position, and a full service position;
   a user interface associated with said brake controller and configured to send a signal representing a request by an operator to reduce brake pressure by a predetermined incremental amount; and
   a controller for decreasing brake pipe pressure in said locomotive braking system in response to receipt of said signal representing said request for incremental brake pressure reduction when the brake handle is not in the release position.

2. The system of claim 1, wherein said controller is programmed to only be responsive to said signal when said brake handle is in said minimum position.

3. The system of claim 2, wherein said controller is programmed to only be responsive to a predetermined number of said signals after said brake handle is moved to the minimum position.

4. The system of claim 1, wherein said user interface is selected from the group consisting of a button, a switch, a touchscreen, or a command received from a remote location.

5. The system of claim 1, further comprising a display associated with said brake controller for displaying any reductions in brake pipe pressure executed in response to said signal.

6. The system of claim 5, wherein said display shows the reductions in brake pipe pressure executed in response to said signal by displaying the current brake pipe pressure.

7. The system of claim 5, wherein said display shows the reductions in brake pipe pressure executed in response to said signal by displaying the target brake pipe pressure to be achieved in response to said signal.

8. A system for incrementally reducing brake pipe pressure in a locomotive braking system, comprising:
- a brake controller having a brake handle moveable between a minimum and a full service position;
- a user interface associated with said brake controller and configured to send a signal representing a request by an operator to reduce brake pressure by a predetermined incremental amount; and
- a controller for decreasing brake pipe pressure in said locomotive braking system in response to receipt of said signal representing said request for incremental brake pressure reduction, wherein said controller is programmed to recalculate the amount of brake pipe pressure reduction associated with movement of said handle between said minimum and said full service positions based on whether said controller has incrementally reduced said brake pipe pressure in response to receipt of one or more of said signals from said user interface.

9. The system of claim 8, wherein said recalculated amount of brake pipe pressure reduction is proportional to the amount of incremental brake pipe pressure reduction made in response to receipt of one or more of said signals from said user interface.

10. The system of claim 9, wherein said controller is programmed to report an incremental reduction requested by an operator via said user interface as an operator activity event to an operator alertness system interconnected thereto.

11. A system for incrementally reducing brake pipe pressure in a locomotive braking system, comprising:
- a brake controller having a brake handle moveable between a minimum and a full service position;
- a user interface associated with said brake controller and configured to send a signal representing a request by an operator to perform a bail off for a predetermined amount of time; and
- a controller for releasing the locomotive brakes of said locomotive braking system in response to receipt of the signal representing said request for the bail off, wherein said controller is programmed to automatically perform said bail off for a predetermined period of time based upon previous manually performed bail offs.

12. The system of claim 11, wherein said user interface includes a button configured to send the signal representing said request for the bail off.

13. The system of claim 12, wherein said user interface includes a handle that is configured to interrupt the signal representing said request for the bail off when said handle is moved.

14. A method of incrementally reducing brake pipe pressure in a locomotive braking system, comprising the steps of:
- providing a user interface configured to send a signal representing a request by an operator to reduce brake pipe pressure by a predetermined incremental amount;
- allowing an operator to request an incremental brake pipe pressure reduction via the user interface without the operator having to move a brake handle;
- decreasing brake pipe pressure in said locomotive braking system by said predetermined amount in response to said operator requesting a brake pressure reduction via the user interface; and
- recalculating the amount of brake pressure reduction associated with movement of the brake handle between a minimum position and a full service position based on said incremental brake pressure reduction.

15. The method of claim 14, wherein said recalculated amount of brake pipe pressure reduction is proportional to the amount of incremental brake pipe pressure reduction requested by said operator.

16. The method of claim 15, further comprising the step of allowing the operator to request a bail off of the locomotive brakes via said user interface.

17. The method of claim 15, further comprising the step of automatically performing a bail off of the locomotive brakes.

* * * * *